(12) United States Patent
Lardies et al.

(10) Patent No.: US 8,313,148 B2
(45) Date of Patent: Nov. 20, 2012

(54) GUIDE SLEEVE FOR A RETAINING ROD OF A NECK REST

(75) Inventors: Alberto Lardies, Barcelona (ES); Olga Arenillas, Barcelona (ES)

(73) Assignee: ITW Automotive Products GmbH & Co. KG, Iserlohn (DE)

( * ) Notice: Subject to any disclaimer, the term of this patent is extended or adjusted under 35 U.S.C. 154(b) by 262 days.

(21) Appl. No.: 12/675,108

(22) PCT Filed: Aug. 5, 2008

(86) PCT No.: PCT/IB2008/002061
§ 371 (c)(1),
(2), (4) Date: Feb. 24, 2010

(87) PCT Pub. No.: WO2009/027781
PCT Pub. Date: Mar. 5, 2009

(65) Prior Publication Data
US 2011/0101758 A1 May 5, 2011

(30) Foreign Application Priority Data
Aug. 25, 2007 (DE) .......................... 10 2007 040 187

(51) Int. Cl.
*A47C 1/10* (2006.01)
(52) U.S. Cl. ........................................ 297/410; 297/391
(58) Field of Classification Search .................. 297/410, 297/391
See application file for complete search history.

(56) References Cited

U.S. PATENT DOCUMENTS

| 4,568,123 | A | 2/1986 | Yasui et al. |
| 6,062,645 | A * | 5/2000 | Russell .......................... 297/410 |
| 6,742,846 | B1 | 6/2004 | Isaacson |
| 6,802,565 | B2 * | 10/2004 | Isaacson ........................ 297/410 |
| 7,159,946 | B2 * | 1/2007 | Gurtatowski et al. ......... 297/410 |
| 7,216,937 | B2 * | 5/2007 | Key et al. ................. 297/452.18 |
| 7,434,886 | B2 | 10/2008 | Yamada |

(Continued)

FOREIGN PATENT DOCUMENTS

DE 3422697 A1 12/1985
(Continued)

OTHER PUBLICATIONS

ISR and WO for PCT/IB2008/002061 mailed Jan. 13, 2009.

*Primary Examiner* — David Dunn
*Assistant Examiner* — Erika Garrett
(74) *Attorney, Agent, or Firm* — Lowe Hauptman Ham & Berner LLP

(57) ABSTRACT

A guide sleeve for support bar of a motor vehicle seatback headrest, comprising a hollow, plastic tube fitted with an axial passage and comprising at its upper end an integral flange segment through which runs the tube's axial passage, further a slider guided in sliding manner in a flange segment aperture perpendicularly to the axis of said passage, and fitted with an external grip and an axial continuous passage which can be aligned with the stem's axial passage respectively the flange segment's aperture, the slider moreover comprising a locking segment which may be made to engage with or disengage from a snap-in notch of the support bar as a function of slider position, further with spring elements acting on the slider and biasing it toward the snap-in notches, said spring elements being constituted by a resilient, integral slider segment resting against a wall segment of the aperture.

8 Claims, 2 Drawing Sheets

U.S. PATENT DOCUMENTS

2005/0077772 A1 * 4/2005 Yamada .................. 297/410

FOREIGN PATENT DOCUMENTS

| | | |
|---|---|---|
| DE | 19919335 A1 | 11/2000 |
| DE | 10134601 A1 | 12/2002 |
| DE | 102007023996 B3 | 9/2008 |
| EP | 0744316 A1 | 11/1996 |
| EP | 1690732 A2 | 8/2006 |
| FR | 2763293 A1 | 11/1998 |
| FR | 2786141 A1 | 5/2000 |
| WO | WO2008142501 A1 | 11/2008 |

* cited by examiner

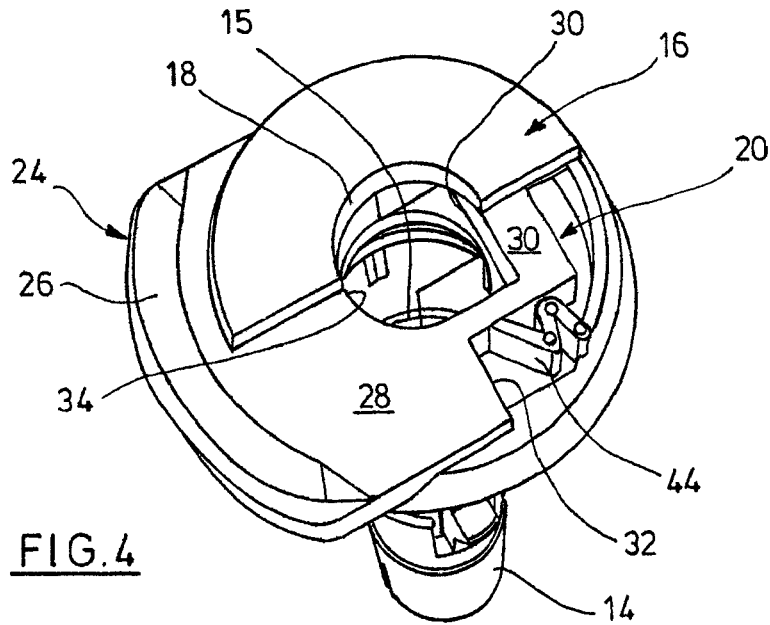
FIG.4
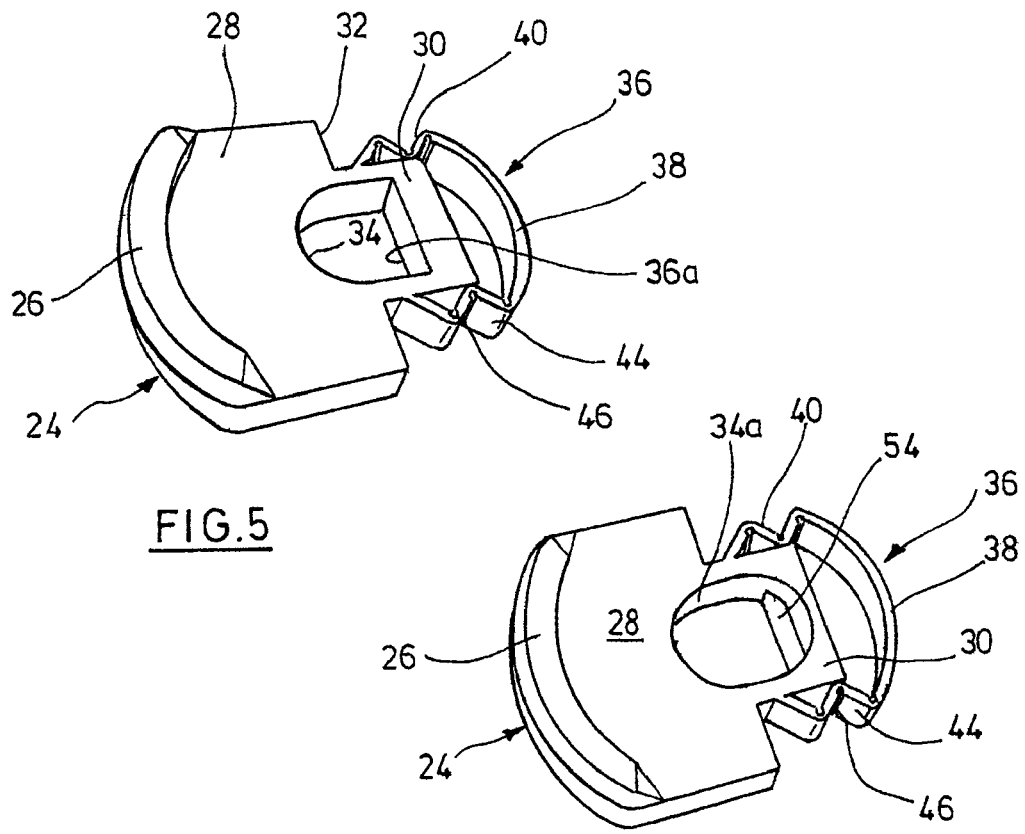
FIG.5
FIG.6

GUIDE SLEEVE FOR A RETAINING ROD OF A NECK REST

RELATED APPLICATIONS

The present application is national phase of PCT/IB2008/002061 filed Aug. 5, 2008, and claims priority from, German Application Number 10 2007 040 187.8 filed Aug. 25, 2007, the disclosures of which are hereby incorporated by reference herein in their entirety.

The present invention relates to guide sleeve for a headrest's support rod—as defined in the preamble of claim 1.

The basic design of a headrest's support-rod guide sleeve mounted on a motor vehicle's seatback consists of a tube fitted with an axially continuous passage and comprising at its upper end a radial flange. The hollow tube is received in a matching cavity of said backrest, the radial flange resting on the backrest's top side. The stem's axial passage comprises a continuous borehole in the radial flange. The headrest's support bar is inserted through said borehole of the radial flange into the axial passage, basically two headrest support rods cooperating with two guide sleeves. The radial flange of at least one guide sleeve is fitted with a recess which runs transversely to the passage axis and which receives a slider. This slider is fitted with a grip projecting from said recess and with a borehole of its own that can be aligned with the borehole in the radial flange and with the axial tube passage. This slider is biased by spring elements and contains a locking segment that cooperates in locking manner with locking notches of the headrest support bar. When the slider element is displaced against the force of the spring element, the locking segment is disengaged from a locking recess of the headrest bar which then may be correspondingly adjusted in the guide sleeve.

Such a guide sleeve is widely known. The spring bias in general is applied by an appropriate leaf or wire spring running excentrically to the slider's borehole. Moreover integrally combining the locking segment and the spring segment into one part also is known.

The objective of the present invention is to create a guide sleeve for a headrest's support bar requiring less material and being simpler to assemble than are the designs of the state of the art.

This objective is attained by the features of claim 1.

In the guide sleeve of the present invention, the spring elements are constituted by a resilient slider segment resting on a wall portion of the recess.

It is the insight of the present invention that by properly selecting the slider's plastic, this slider no longer requires a separate spring if its spring element is appropriately shaped. In this manner at least one component is eliminated when making the guide sleeve. Also the spring element assembly is saved.

In one embodiment mode of the present invention, the resilient portion includes a straight or arcuate, elongated spring element running in the plane of the slider and being spaced from it and resting against a wall element on the side opposite the grip, the ends of said element being connected to resilient legs of which the other ends are connected to the slider. The straight or arcuate spring element rests against a preferably matching contour of the recess wall. The spring action is generated by the legs which are deformed correspondingly when the slider is displaced. One embodiment mode of the present invention provides that the slider be designed, and the resilient legs be mounted, in a manner that the slider comprise a slider segment of lesser width at the end opposite the grip and that the legs be connected to said smaller width slider segment. However the legs also may be connected to the offset which is subtended by the slider segment of lesser width.

The legs may be resiliently deformed for instance by appropriately bending them. In one advantageous embodiment mode of the present invention, the legs are pleated in zig-zag or accordion-like manner. Using this design, the leg length is reduced when pressure is applied to them in their longitudinal direction, bending in particular taking place in particular at the turning sites of the leg elements. In order that said bending be sufficient, another embodiment mode of the present invention provides that the legs be weaker at the said zig-zag/accordion turning sites.

The locking element may be in the form of a metal pin running excentrically through the slider's continuous borehole. Using such a pin for such a purpose is known per se. Alternatively the locking element may be constituted by a continuous borehole wall edge opposite the grip.

To limit the excursion of the slider in the recess, one embodiment mode of the present invention provides that the slider be fitted at its underside with a protrusion entering an elongated slot in a lower recess wall in the flange segment, said aperture outwardly limiting the slider excursion on account of the spring bias.

One illustrative embodiment of the present invention is elucidated below in relation to the appended drawings.

FIG. 4 is a view similar to that of FIG. 1, however showing the condition of the slider when being actuated, FIG. 5 is a perspective of the slider of the embodiment mode of FIGS. 1 through 4, and FIG. 6 shows an alternative embodiment of a slider.

Figures 1, 2:
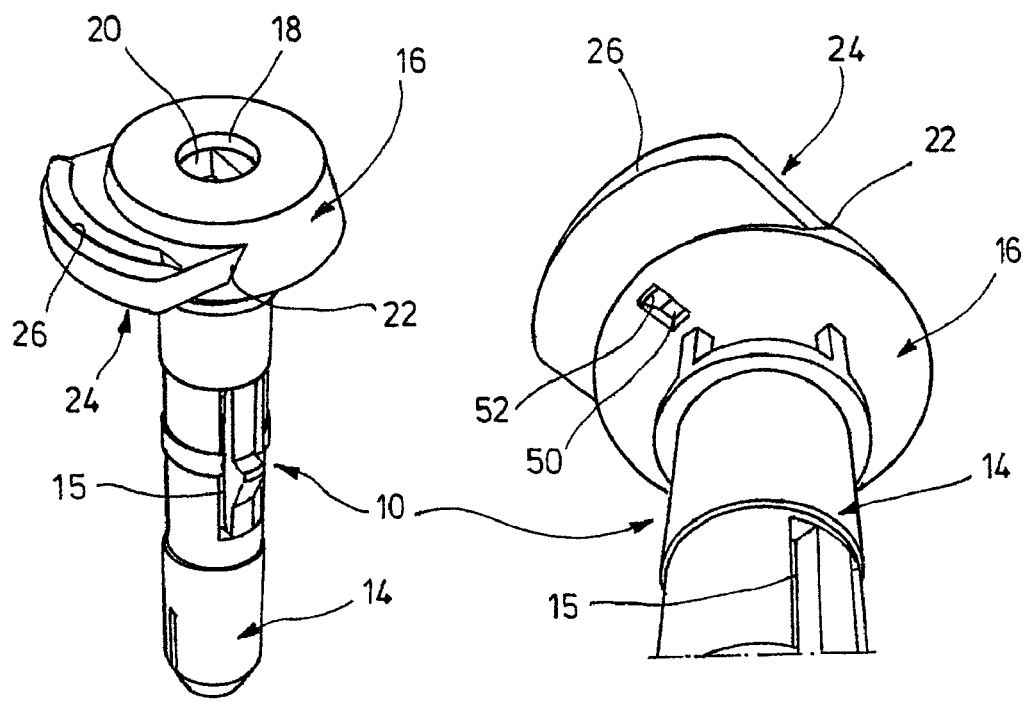
FIG. 1 is a perspective of a guide sleeve of the invention.
FIG. 2 is a bottom view of a portion of the guide sleeve of FIG. 1.

FIGS. 1 and 2 show a guide sleeve 10 comprising an approximately cylindrical tube 14 and, at its upper end, a radial flange 16. The tube 14 and the flange 16 are made of plastic and integral with one another. The tube 14 comprises an axial borehole 15 which is aligned with a circular aperture 18 of the flange 16. The flange 16 is fitted with a recess 20 which is open at 22. The recess 20 receives a slider 24 facing a grip 26 configured outside the recess 20. The slider 24 is discussed in detail in the discussion relating to FIG. 5

The slider 24 is substantially flat and comprises a first segment 28 and a second segment 30, the latter being narrower than the former, thereby subtending two shoulders 32. An opening 34 in the form of a semi-circular and a rectangular portion is constituted at the transition between the segments 28, 30 and between the shoulders 32. An edge 36a is subtended in the rectangular portion and enters from the lower side of the slider 24 into the opening 34.

A spring 36 is integral with the slider 24. The spring comprises an arcuate/bent, bridging lower element 38 and two legs 40, 44 configured in accordion or zig-zag manner. The lower element 38 runs a space apart from the segment 30 and exhibits the same height/thickness. Each leg 40, 44 comprises three parts subtending an angle of about 90° to one another. The reversal sites comprise weakened sites 46 in the form of thinner leg parts.

Figure 3:
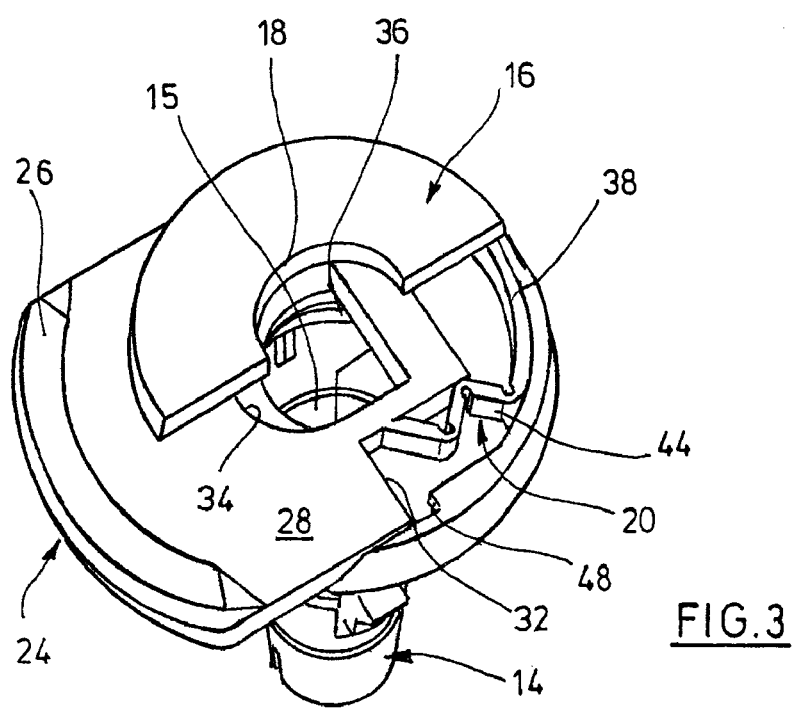
FIG. 3 is a view similar to that of FIG. 1, however showing a cutaway flange of the guide sleeve of FIG. 1.

FIG. 3 illustrates the configuration of the slider 24 in the recess 20. The recess assumes about the same geometry in the zone of the arcuate spring element 38. As a result the spring element 38 rests against the associated wall segment of the recess 20. Enough space is available between the legs 40, 44 and the associated wall segment to receive these legs. The legs 40, 44 moreover are configured at the outside of the narrower segment 30 as indicated in FIGS. 3, 4 and 5. Following assembly, the shoulders 32 are sufficiently spaced from the shoulders 48 constituted in the associated wall segment of the recess 20. The displacement of the slider 24 into the recess 20 therefore is limited by the shoulders 32, 48.

FIG. 2 shows that the bottom of the recess 20 comprises an elongated rectangular opening 50 entered by a downward-pointing protrusion 52 of the slider 24. The protrusion 52 limits the slider 24 from moving out of the recess 20. On the other hand the slider 24 is prevented by the shoulders 32, 48 from moving into the recess 20. The end of such a displacement is indicated in FIG. 4. In the process, the legs 40, 44 are folded against each other, a part of the legs 40, 44 that constitutes a reversal site being guided through the outside of the of the segment 30 of lesser width. Folding the legs 40, 44 entails a spring tension biasing the slider 24 outward. However, when the spring is relaxed as shown in FIG. 3, the spring bias suffices to move the edge 36a to engage with a locking notch of an omitted headrest bar.

When installing a headrest bar, the slider 4 is maximally forced into the recess 20 as shown in FIG. 4, as a result of which the opening 34 is aligned to such an extent with the continuous borehole 18 and the axial passage of the tube 14 that this tube is very easily insertable. Next the grip 26—whereby pressure is applied to the slider 24—is released, as a result of which this slider 24 moves outward toward the position shown in FIG. 3. The bar is displaced until the edge 36 engages a notch in it. Henceforth the locking bar shall be locked in the guide sleeve.

The embodiment mode of FIG. 6 for an alternative slider 24 is substantially the same as that of FIG. 5. The difference relative to FIG. 5 is an oval opening 34a which is crossed excentrically by a metal pin 54. The metal pin 54 serves the same purpose as the edge 36 and the opening 34 of FIG. 5, namely securing locking engagement with a locking notch of a headrest bar. The metal pin is imbedded in the material of the slider.

When the slider must be removed from the recess 20, an upward pressure must be applied on the protrusion 52 of FIG. 2 to remove it from the elongated recess 50. The slider 20 is easily pulled out. Intrinsically this procedure may be carried out only when the headrest bar is out of the guide sleeve 10.

The invention claimed is:
1. A guide sleeve, comprising
a tube having an axial passage; and
an radial flange at an upper end of the tube;
wherein
the flange includes
a flange recess perpendicular to an axis of the said axial passage; and
a continuous borehole configured to be aligned with the axial passage;
a slider configured to be guided in sliding manner in the flange recess, the slider includes
an external grip;
a locking segment; and
spring elements biasing the slider inward or outward of the recess,
wherein
the spring elements are constituted by a resilient, integral segment of the slider, said segment resting against a wall portion of the recess;
the slider further comprises a protrusion at a underside thereof; and
the flange further comprises an elongated slot at a lower wall of the recess, the protrusion is configured to be engaged with the slot, and the slot is configured to limit outward displacement of the slider imparted by a spring bias of the springs.
2. Guide sleeve as claimed in claim 1, wherein each of the springs comprises
an elongated, straight or arcuate element and spaced away from the slider and resting against a wall segment of the recess opposite the grip, and
resilient legs having first ends connected to the element, and second ends connected to the slider.
3. Guide sleeve as claimed in claim 2, wherein
the slider comprises at a side opposite the grip a segment of lesser width; and
the legs are laterally connected with the segment of lesser width.
4. Guide sleeve as claimed in claim 3, wherein the legs are received in a space between the segment of lesser width and an associated wall of the recess.
5. Guide sleeve as claimed in claim 2, wherein the legs run in zig-zag configuration.
6. Guide sleeve as claimed in claim 5, wherein the legs exhibit a zone of lesser mechanical strength at reversal sites of the zig-zag configuration.
7. Guide sleeve as claimed in claim 1, wherein
the slider further comprises a continuous slot, and
a metal pin fitted in the continuous slot and acting as the locking segment and running excentrically transversely to the slot.
8. Guide sleeve as claimed in claim 1, wherein the locking segment is constituted by an edge of an opening.

* * * * *